(12) United States Patent
Lin et al.

(10) Patent No.: US 12,257,718 B2
(45) Date of Patent: Mar. 25, 2025

(54) SYSTEM AND METHOD FOR CONTROLLING A MOTION OF A ROBOT

(71) Applicant: Mitsubishi Electric Research Laboratories, Inc., Cambridge, MA (US)

(72) Inventors: Chungwei Lin, Arlington, MA (US); Yebin Wang, Cambridge, MA (US); Rien Quirynen, Somerville, MA (US); Devesh Jha, Cambridge, MA (US); Bingnan Wang, Belmont, MA (US); William Vetterling, Cambridge, MA (US); Siddarth Jain, Cambridge, MA (US); Scott Bortoff, Brokline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 351 days.

(21) Appl. No.: 17/659,246

(22) Filed: Apr. 14, 2022

(65) Prior Publication Data
US 2023/0330853 A1    Oct. 19, 2023

(51) Int. Cl.
| | | |
|---|---|---|
| B25J 9/16 | (2006.01) | |
| B25J 5/00 | (2006.01) | |
| B62D 15/02 | (2006.01) | |

(52) U.S. Cl.
CPC ............ *B25J 9/1664* (2013.01); *B25J 5/007* (2013.01); *B25J 9/1653* (2013.01); *B62D 15/0285* (2013.01)

(58) Field of Classification Search
CPC ........ B25J 9/1664; B25J 5/007; B25J 9/1653; B62D 15/0285; G05D 2109/10; G05D 1/246; G05D 1/622; G05D 1/644; G05B 2219/40474
USPC ........................................................... 701/41
See application file for complete search history.

(56) References Cited

U.S. PATENT DOCUMENTS

2022/0274255 A1* 9/2022 Okawa ................... B25J 9/1697

* cited by examiner

*Primary Examiner* — Scott A Reinbold
(74) *Attorney, Agent, or Firm* — Gene Vinokur

(57) ABSTRACT

The present disclosure provides a system and a method for controlling a motion of a robot from a starting point to a target point within a bounded space with a floorplan including one or multiple obstacles. The method includes solving for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space. The method further includes selecting an equipotential curve with a potential value different from a potential value of an obstacle equipotential curve, determining a motion path based on the selected equipotential curve, and controlling the motion of the robot based on the determined motion path.

10 Claims, 16 Drawing Sheets

SYSTEM AND METHOD FOR CONTROLLING A MOTION OF A ROBOT

TECHNICAL FIELD

The present disclosure relates generally to motion planning of robots, and more specifically to a system and a method for controlling a motion of a robot from a starting point to a target point within a bounded space including one or multiple obstacles.

BACKGROUND

Several control systems are employed by robots to determine a motion path for controlling a motion of the robot. The motion of the robot may be controlled based on the determined motion path to execute a task. For example, one of the tasks of the robot is to traverse from a starting point to a target point in an environment. A motion path that connects from the starting point to the target point may be determined. However, the environment includes obstacles with which the robot should not collide. Thus, if the motion path is determined without considering the obstacles, the determined motion path may be susceptible to collision with the obstacles. To that end, the obstacles present in the environment need to be considered in the determination of the motion path to determine a safe motion path that connects from the starting point to the target point while avoiding the obstacles.

Many motion planning methods have been proposed, for example, graph-based A* and D* methods, sampling-based methods such as probabilistic roadmaps (PRM), expansive-space trees, rapidly exploring random trees (RRT), optimal variants RRT* and probabilistic roadmap (PRM*), anytime RRT, and A-search guided tree (AGT). However, such methods involve local search, and they are heuristic and probabilistic. Further, the sampling-based methods, such as RRT methods, are computationally expensive and the motion path generated by the sampling-based methods may not be optimal and/or practical.

Therefore, there is still a need for a system and a method for determining the motion path for controlling the motion of the robot, without colliding with the obstacles.

SUMMARY

It is an object of some embodiments to provide a system and a method for controlling a motion of a robot from a starting point to a target point within a bounded space. The bounded space, for example, may be an indoor space, a parking space, a road path, or the like. The bounded space includes one or multiple obstacles such as walls, objects, vehicles, and other physical entities present in the bounded space. The bounded space is bounded by boundaries. It is an objective of some embodiments to control the motion of the robot from the starting point to the target point within the bounded space, without colliding with the obstacles. In particular, it is an objective of some embodiments to determine a motion path for the robot, such that the determined motion path connects the starting point to the target point while avoiding the obstacles.

Some embodiments are based on recognition that to determine the motion path the obstacles and the boundaries of the bounded space needs to be considered. Some embodiments are based on the realization that electrostatics can used to describe the obstacles, and the boundaries. For example, the obstacles, and the boundaries can be treated as metallic surfaces in the electrostatics problem. Each metallic surface has a constant potential value. To that end, in some embodiments, a bounded virtual space corresponding to the bounded space is formed by scaling the floorplan of the bounded space with the obstacles and applying opposite charges to at least two opposite bounds (e.g., the boundaries) of the bounded virtual space while treating the scaled obstacles as the metallic surfaces with the constant potential value.

Further, an electric potential in the bounded virtual space is solved for to produce multiple equipotential curves within the bounded virtual space. An equipotential curve is a curve on which value of the electric potential is constant. Each given point in the bounded virtual space has an electric potential value. The starting point, the target point, and surfaces of the scaled obstacles in the bounded virtual space are located to determine a potential value of the starting point, a potential value of the target point, and a potential value of an obstacle equipotential curve closest to the surfaces of the scaled obstacles. Further, an equipotential curve with a potential value different from the potential value of the obstacle equipotential curve, is selected. Based on the selected equipotential curve, the motion path that avoids all obstacles can be determined.

For example, to determine the motion path based on the selected equipotential curve, a first path from the starting point to a first point on the selected equipotential curve and a second path from the target point to a second point on the selected equipotential curve, are determined. Further, a third path connecting the first point and the second point along the selected equipotential curve is determined. The motion path can be determined as a combination of the first path connecting the starting point and the first point, the second path connecting the target point and the second point, and the third path connecting the first point and the second point along the selected equipotential curve. Based on the determined motion path, the motion of the robot is controlled from the starting point to the target point while avoiding the obstacles.

According to an embodiment, the first path and the second path are determined to reach the potential value of the selected equipotential curve and follow the selected equipotential curve. To determine the first path and/or the second path (or to reach to the potential value of the selected equipotential curve), one or a combination of downstream search and upstream search, based on a gradient of the potential value, may be performed until the potential value of the selected equipotential curve is reached. For example, the first path and the second path are extended segment-wise in a direction perpendicular to a current equipotential curve towards the potential value of the selected equipotential curve, until the first path and the second path reach the selected equipotential curve. However, in some cases, the next equipotential curve corresponds to the obstacle equipotential curve. In such cases, the first path or the second path are extended to follow the current equipotential curve with a predetermined step until the next equipotential curve stops being the obstacle equipotential curve.

Some embodiments are based on recognition that the motion path determined based on the first path, the second path, and the third path, may not be feasible. For example, the determined motion path may be too close to one or more of the obstacles. As a result, the motion of the robot, when controlled based on the determined motion path, may be susceptible to collision with the obstacles. To mitigate such a problem, the determined motion path may be modified. In an embodiment, the motion path is modified based on local information to produce a modified motion path. The local information may include locations and dimensions of the obstacles.

Some embodiments are based on realization that the determination of the motion path using the equipotential curves is advantageous. For example, potential field of the equipotential curves has no local extremal and saddle points, thereby eliminating local traps. Additionally, the potential field is long ranged, hence obstacles far away influence local potential value and thus the equipotential curve. In other words, the equipotential curves allow use of global information of all obstacles and the boundaries for the determination of the motion path.

Further, some embodiments are based on realization that multiple motion paths can be determined and a motion path from the multiple motion paths can be selected for the motion of the robot. For example, two equipotential curves with potential values different from the potential value of the obstacle equipotential curve are selected and two corresponding motion paths, for example, a first motion path and a second motion path, are determined. Both the first motion path and the second motion path connect from the starting point to the target point while avoiding the obstacles. Further, one of the first motion path and the second motion path is selected according to an optimization criterion. The optimization criterion may be a smoothness of the motion path, closeness of the motion path to the obstacles (i.e., safety), length of the motion path, or the like.

Additionally or alternatively, in some embodiments, to enhance smoothness of the first motion path and the second motion path, post-processing techniques are applied on the first motion path and the second motion path. For example, cubic interpolation is applied on the first motion path and the second motion path to produce a first smooth motion path and a second smooth motion path, respectively.

Accordingly, one embodiment discloses a controller for controlling a motion of a robot from a starting point to a target point within a bounded space with a floorplan including one or multiple obstacles. The controller comprises at least one processor, and memory having instructions stored thereon that, when executed by the at least one processor, cause the controller to: solve for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space; locate the starting point, the target point, and surfaces of the scaled obstacles in the bounded virtual space to determine a potential value of the starting point, a potential value of the target point, and a potential value of an obstacle equipotential curve closest to the surfaces of the scaled obstacles; select an equipotential curve with a potential value different from the potential value of the obstacle equipotential curve; determine a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve; determine a motion path as a combination of the first path connecting the starting point and the first point, the second path connecting the target point and the second point, and a third path connecting the first point and the second point along the selected equipotential curve; and control the motion of the robot based on the determined motion path.

Accordingly, another embodiment discloses a method for controlling a motion of a robot from a starting point to a target point within a bounded space with a floorplan including one or multiple obstacles. The method comprises solving for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space; locating the starting point, the target point, and surfaces of the scaled obstacles on the bounded virtual space to determine a potential value of the starting point, a potential value of the target point, and a potential value of an obstacle equipotential curve closest to the surfaces of the scaled obstacles; selecting an equipotential curve with a potential value different from the potential value of the obstacle equipotential curve; determining a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve; determining a motion path as a combination of the first path connecting the starting point and the first point, the second path connecting the target point and the second point, and a third path connecting the first point and the second point along the selected equipotential curve; and controlling the motion of the robot based on the determined motion path.

Accordingly, yet another embodiment discloses a non-transitory computer-readable storage medium embodied thereon a program executable by a processor for performing a method for controlling a motion of a robot from a starting point to a target point within a bounded space with a floorplan including one or multiple obstacles. The method comprises solving for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space; locating the starting point, the target point, and surfaces of the scaled obstacles in the bounded virtual space to determine a potential value of the starting point, a potential value of the target point, and a potential value of an obstacle equipotential curve closest to the surfaces of the scaled obstacles; selecting an equipotential curve with a potential value different from the potential value of the obstacle equipotential curve; determining a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve; determining a motion path as a combination of the first path connecting the starting point and the first point, the second path connecting the target point and the second point, and a third path connecting the first point and the second point along the selected equipotential curve; and controlling the motion of the robot based on the determined motion path.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
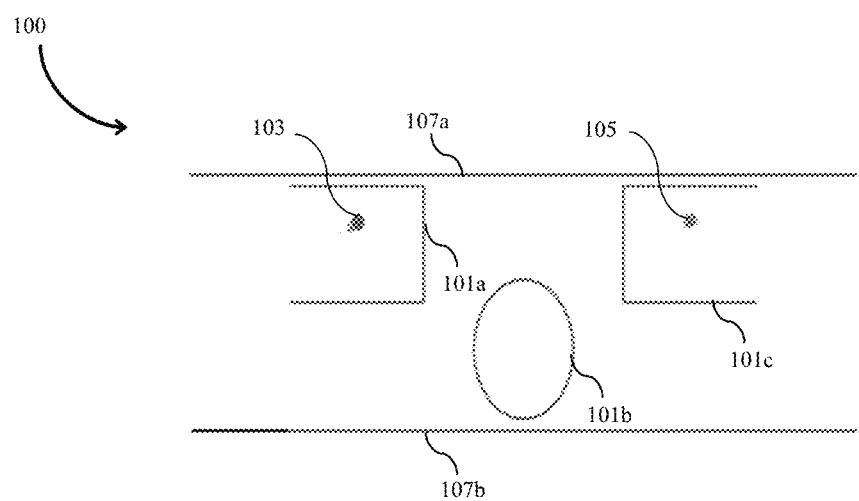
FIG. 1A shows a schematic of a bounded space with a floorplan, according to an embodiment of the present disclosure.

FIG. 1A shows a schematic of a bounded space 100 with a floorplan, according to an embodiment of the present disclosure. The bounded space 100, for example, may be an indoor space, a parking space, a road path, and the like. The floorplan of bounded space 100 illustrates one or multiple obstacles 101a, 101b, and 101c, present in the bounded space 100. The obstacles 101a, 101b, and 101c may be walls, objects, vehicles, and other physical entities present in the bounded space 100. The bounded space 100 is bounded by boundaries 107a and 107b. It is an objective of some embodiments to control a motion of a robot from a starting point 103 to a target point 105 within the bounded space 100, without colliding with the obstacles 101a, 101b, and 101c. In particular, it is an objective of some embodiments to determine a motion path for the robot, such that the determined motion path connects the starting point 103 to the target point 105 while avoiding the obstacles 101a, 101b, and 101c.

To achieve such an objective, some embodiments provide a controller for controlling the motion of the robot from the starting point 103 to the target point 105. Such a controller is explained below in FIG. 1B.

Figure 1B:
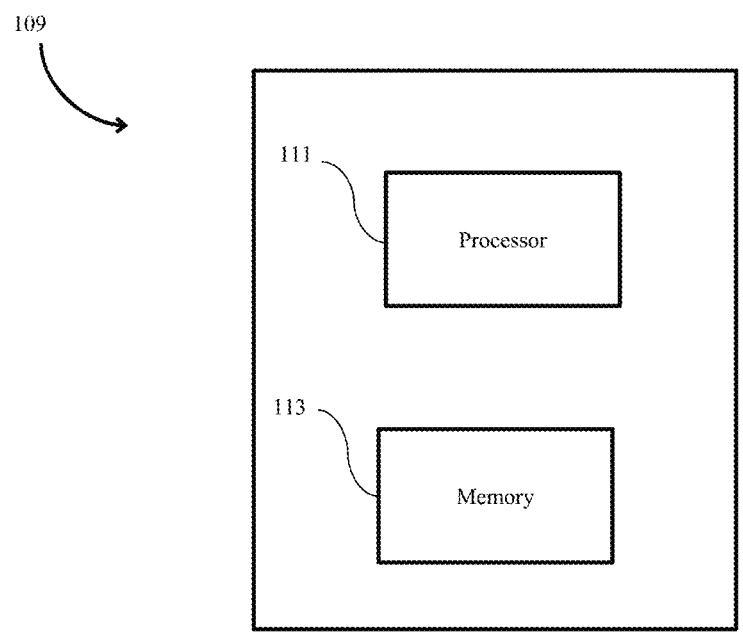
FIG. 1B shows a controller for controlling a motion of a robot from a starting point to a target point, according to an embodiment of the present disclosure.

FIG. 1B shows a controller 109 for controlling the motion of the robot from the starting point 103 to the target point 105, according to an embodiment of the present disclosure. The controller 109 includes a processor 111 and a memory 113. The processor 111 may be a single core processor, a multi-core processor, a computing cluster, or any number of other configurations. The memory 113 may include random access memory (RAM), read only memory (ROM), flash memory, or any other suitable memory systems. Additionally, in some embodiments, the memory 113 may be implemented using a hard drive, an optical drive, a thumb drive, an array of drives, or any combinations thereof.

Some embodiments are based on realization that electrostatics can be used to describe the obstacles 101a, 101b, and 101c, and the boundaries 107a and 107b. For example, the obstacles 101a, 101b, and 101c, and the boundaries 107a and 107b can be treated as metallic surfaces in a problem of electrostatics. Each metallic surface has a constant potential value. To that end, the processor 111 is configured to determine a bounded virtual space corresponding to the bounded space 100. In an embodiment, the bounded virtual space is formed by scaling the floorplan of the bounded space 100 with the obstacles 101a, 101b, and 101c and applying charge to at least one bound of the bounded virtual space while treating the scaled obstacles as the metallic surfaces with a constant potential value. For example, in an embodiment, opposite charges may be applied to the boundaries 107a and 107b.

Further, the processor 111 solves for an electric potential in the bounded virtual space to produce multiple equipotential curves within the bounded virtual space. The produced equipotential curves are shown in FIG. 1C.

Figure 1C:
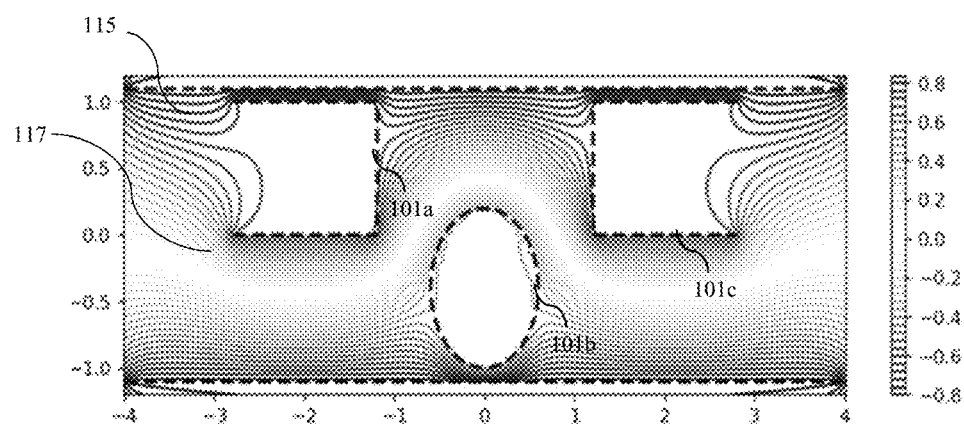
FIG. 1C shows example equipotential curves, according to an embodiment of the present disclosure.

FIG. 1C shows example equipotential curves 115, according to an embodiment of the present disclosure. An equipotential curve is a curve on which the value of the electric potential is constant. Each given point in the bounded virtual space has a potential value. The processor 111 locates the starting point 103, the target point 105, and surfaces of the scaled obstacles 101a, 101b, and 101c on the bounded virtual space to determine a potential value of the starting point 103, a potential value of the target point 105, and a potential value of an obstacle equipotential curve closest to the surfaces of the scaled obstacles. Further, the processor 111 selects an equipotential curve with a potential value different from the potential value of the obstacle equipotential curve. For example, the processor 111 selects an equipotential curve 117 which has a potential value different from the potential value of the obstacle equipotential curve 115. Based on the selected equipotential curve, the motion path can be determined as described below in FIG. 1D.

Figure 1D:
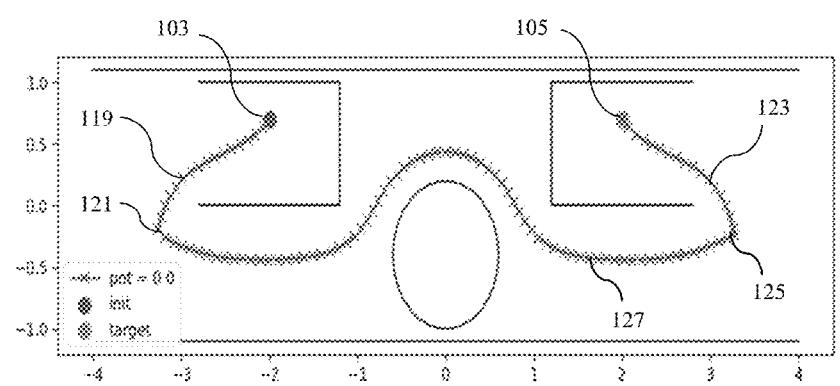
FIG. 1D shows a schematic for determining a motion path based on a selected equipotential curve, according to some embodiments of the present disclosure.

FIG. 1D shows a schematic for determining the motion path based on the selected equipotential curve, according to some embodiments of the present disclosure. The processor 111 determines a first path 119 from the starting point 103 to a first point 121 on the selected equipotential curve and a second path 123 from the target point 105 to a second point 125 on the selected equipotential curve. The processor 111 further determines a third path 127 connecting the first point 121 and the second point 125 along the selected equipotential curve. Further, the processor 111 determines a motion path as a combination of the first path 119 connecting the starting point 103 and the first point 121, the second path 123 connecting the target point 105 and the second point 125, and the third path 127 connecting the first point 121 and the second point 125 along the selected equipotential curve. Based on the determined motion path, the processor 111 controls the motion of the robot from the starting point 103 to the target point 105 while avoiding the obstacles 101a, 101b, and 101c.

According to an embodiment, the first path 119 and the second path 123 include respective segments. The first path 119 and/or the second path 123 are determined to reach the potential value of the selected equipotential curve and follow the selected equipotential curve. To determine the first path 119 and/or the second path 123 (or to reach to the potential value of the selected equipotential curve), one or a combination of downstream search and upstream search, based on a gradient of the potential value, may be performed until the potential value of the selected equipotential curve is reached. For example, the processor 111 extends the first path 119 and the second path 123 segment-wise in a direction perpendicular to a current equipotential curve towards the potential value of the selected equipotential curve, until the first path 119 and the second path 123 reach the selected equipotential curve or a next equipotential curve is the obstacle equipotential curve, as explained below in FIG. 1E.

Figure 1E:
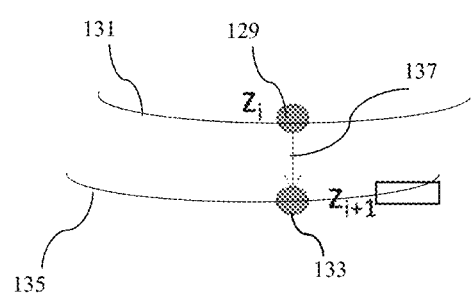
FIG. 1E illustrates extending of a first path, according to an embodiment of the present disclosure.

FIG. 1E illustrates extending of the first path 119, according to an embodiment of the present disclosure. The processor 111 extends/generates a segment of the first path 119 from a point $z_i$ 129 on a current equipotential curve 131 to a next point $z_{i+1}$ 133 on a next equipotential curve 135 in a direction 137 perpendicular to the current equipotential curve 131 towards the potential value of the selected equipotential curve. The direction 137 is referred to as a gradient direction. Such an extension of the first path 119 is carried out until the selected equipotential curve is reached. In a similar manner, the processor 111 extends the second path 123 until the selected equipotential curve is reached.

However, in some cases, the next equipotential curve 135 corresponds to the obstacle equipotential curve or the next point $z_{i+1}$ 133 lies inside the obstacle. In such cases, the segment of the first path 119 is extended to follow the current equipotential curve 131 with a predetermined step until the next equipotential curve stops being the obstacle equipotential curve. The extension of the segment of the first path 119, when the next equipotential curve is the obstacle equipotential curve or the next point $z_{i+1}$ 133 lies inside the obstacle, is explained below in FIG. 1F.

Figure 1F:
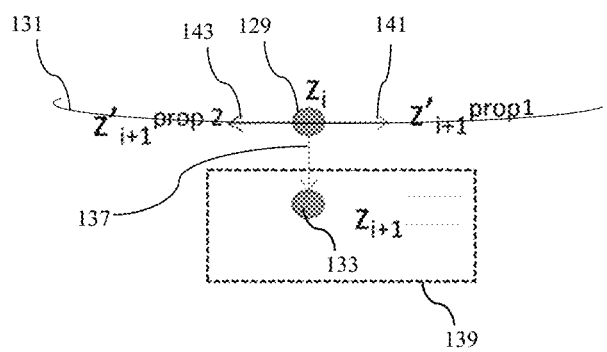
FIG. 1F illustrates extending of the first path when a next point lies inside an obstacle, according to an embodiment of the present disclosure.

FIG. 1F illustrates extending of the first path 119 when the next point $z_{i+1}$ 133 lies inside an obstacle 139, according to an embodiment of the present disclosure. When the next point $z_{i+1}$ 133 lies inside the obstacle 139, the processor 111 determines points $z'_{i+1}{}^{prop1}$ and $z'_{i+1}{}^{prop2}$ along directions 141 and 143, respectively, perpendicular to the gradient direction 137. Since the points $z'_{i+1}{}^{prop1}$ and $z'_{i+1}{}^{prop2}$ lie outside the obstacle 139, the segment of the first path 119 may be extended either in the direction 141 or the direction 143 with the predetermined step to reach the point $z'_{i+1}{}^{prop1}$ or $z'_{i+1}{}^{prop2}$. For example, the processor 111 may extend the segment of the first path 119 to the point $z'_{i+1}{}^{prop1}$ in the direction 141.

However, one of the points $z'_{i+1}{}^{prop1}$ and $z'_{i+1}{}^{prop2}$ may lie within the obstacle 139. In an embodiment, the processor 111 determines if any of the points $z'_{i+1}{}^{prop1}$ and $z'_{i+1}{}^{prop2}$ lie inside the obstacle 139 based on residue theorem. Such a case, where one of the points $z'_{i+1}{}^{prop1}$ and $z'_{i+1}{}^{prop2}$ lie within the obstacle 139, is explained below in FIG. 1G.

Figure 1G:
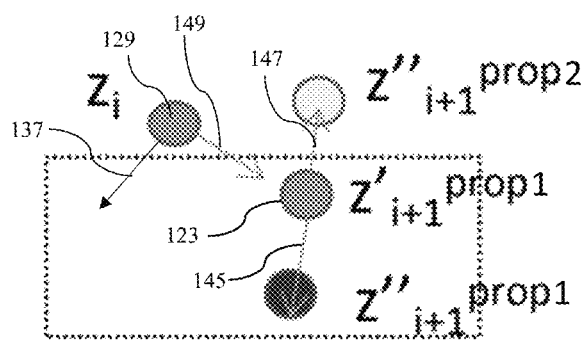
FIG. 1G illustrates a case where a point $z'^{prop1}_{i+1}$ lies inside the obstacle, according to an embodiment of the present disclosure.

FIG. 1G illustrates a case where the point $z'_{i+1}{}^{prop1}$ lies inside the obstacle 139, according to an embodiment of the present disclosure. In such a case, it is not desired to extend the segment of the first path 119 to the point $z'_{i+1}{}^{prop1}$. The processor 111 determines points $z''_{i+1}{}^{prop1}$ and $z''_{i+1}{}^{prop2}$ along directions 145 and 147, respectively, perpendicular to a direction 149. Further, the processor 111 extends the segment of the first path 119 to the point that lies outside the obstacle 139. For example, the processor 111 extends the segment of the first path 119 to the point $z''_{i+1}{}^{prop2}$ along the directions 147.

In a similar manner (as described in FIGS. 1E-1G), the second path 123 is also extended segment-wise to reach the selected equipotential curve. Additionally or alternatively, the processor 111 similarly determines the shortest first path and the shortest second path of segments following or perpendicular to the equipotential curves, as described FIGS. 1E-1G.

Some embodiments are based on recognition that the motion path determined based on the first path 119, the second path 123, and the third path 127, may not be feasible. For example, the determined motion path may be near to one or more of the obstacles 101a, 101b, and 101c. As a result, the motion of the robot, when controlled based on the determined motion path, may be susceptible to collision with the obstacles 101a, 101b, and 101c. To mitigate such a problem, the determined motion path may be modified.

Figure 2:
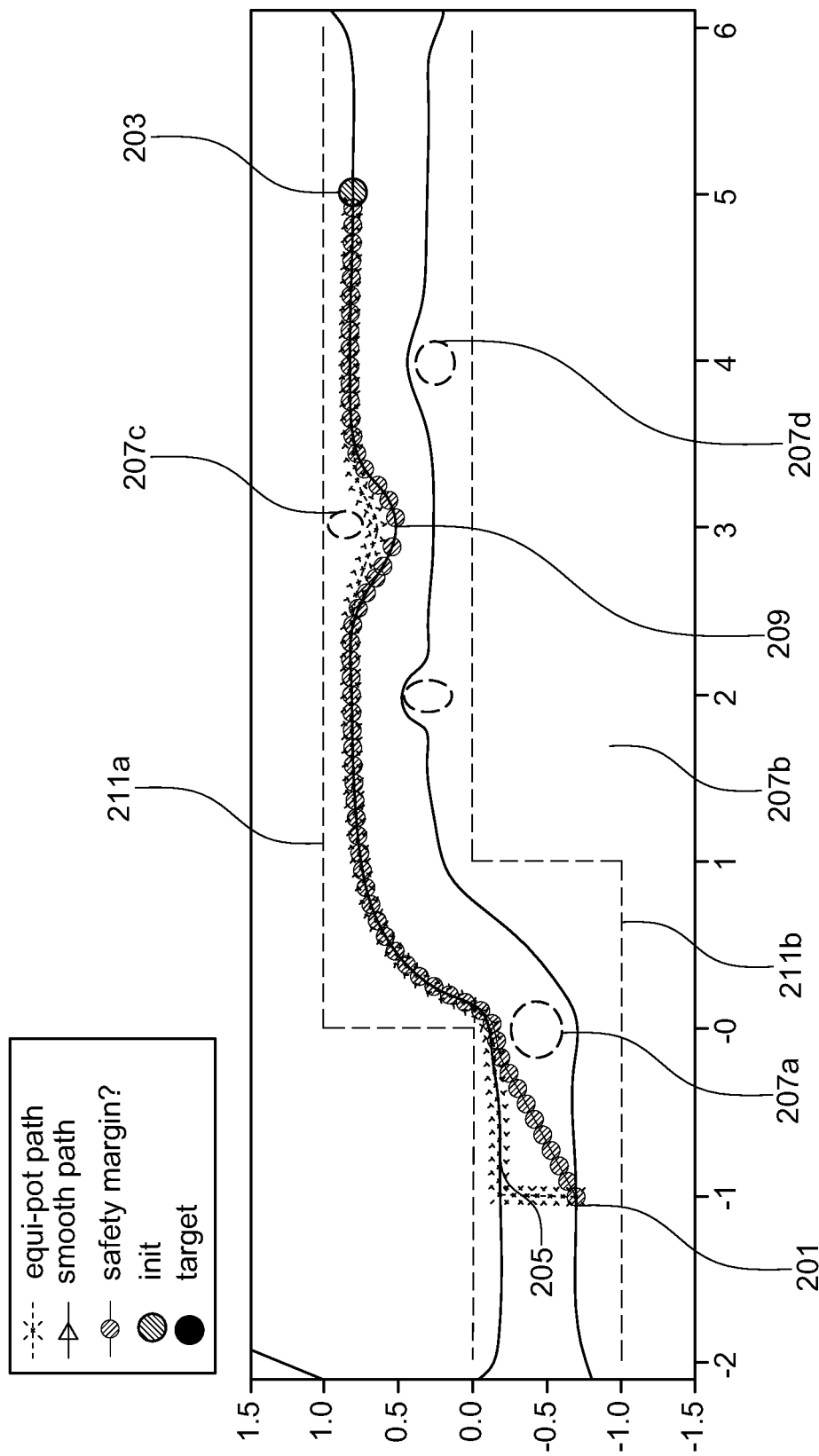
FIG. 2 illustrates modification of the motion path, according to an embodiment of the present disclosure.

FIG. 2 illustrates modification of the motion path, according to an embodiment of the present disclosure. A motion path 205 connects a starting point 201 and a target point 203 while avoiding obstacles 207a, 207b, 207c, and 207d. However, the motion path 205 is close to the obstacle 207c. To increase safety of the motion path 205, the motion path 205 is modified based on local information to produce a modified motion path 209. The local information may include location and dimensions of the obstacles 207a, 207b, 207c, and 207d, as well as boundaries 211a and 211b.

Some embodiments are based on realization that the determination of the motion path using the equipotential curves is advantageous. For example, potential field has no local extremal and saddle points, thereby eliminating local traps upon constructing the motion path, a procedure described in FIGS. 1E-1G. Additionally, the potential field is long ranged, hence obstacles far away influence local potential value and thus the equipotential curve. In other words, the equipotential curves allow use of global information of all obstacles and the boundaries for the determination of the motion path.

Some embodiments are based on realization that multiple motion paths can be determined and a motion path from the multiple motion paths can be selected for the motion of the robot.

Figure 3:
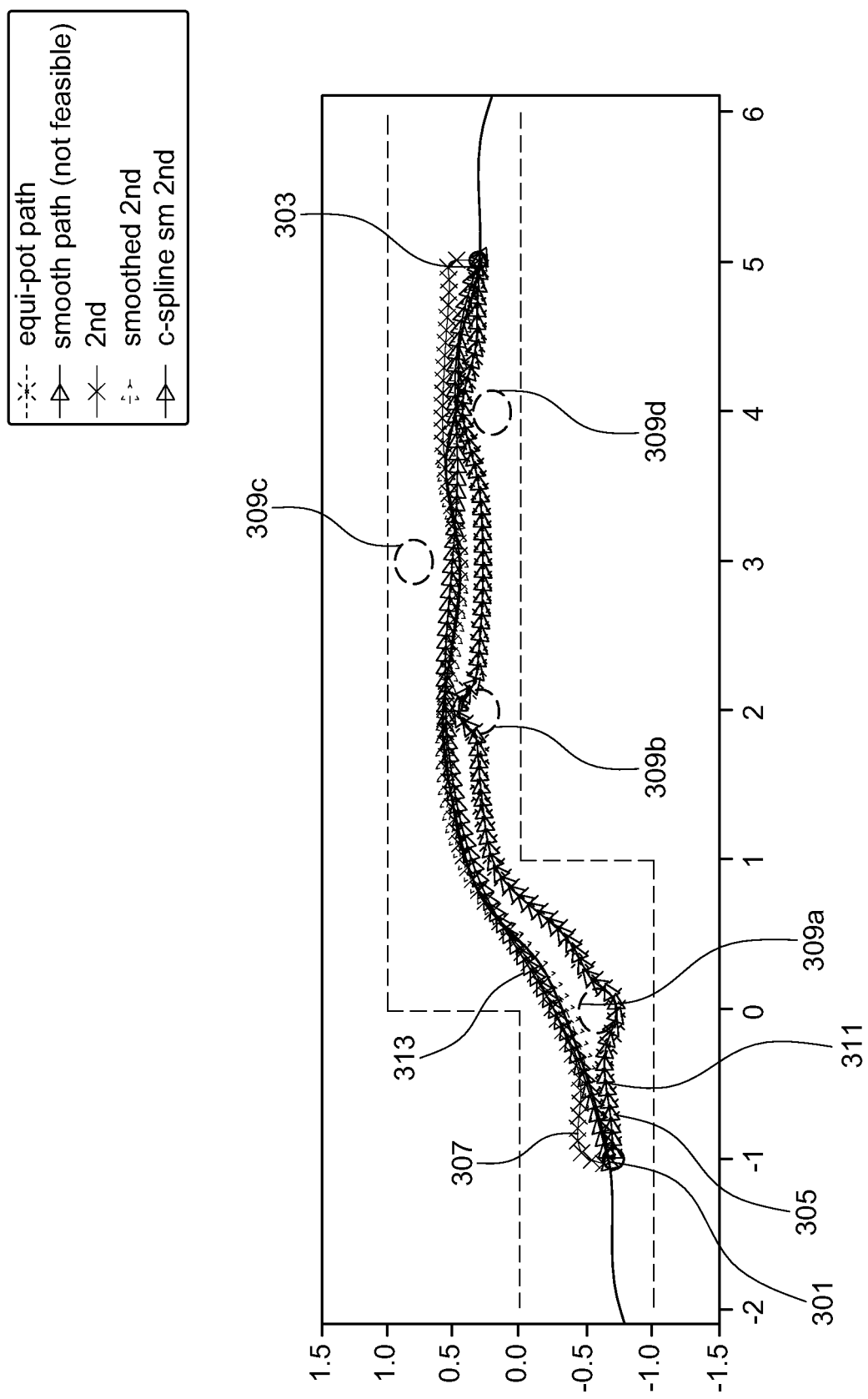
FIG. 3 shows a schematic of multiple motion paths, according to an embodiment of the present disclosure.

FIG. 3 shows a schematic of the multiple motion paths, according to an embodiment of the present disclosure. The processor 111 selects multiple equipotential curves with potential values different from the potential value of the obstacle equipotential curve. Further, the processor 111 determines a motion path for each of the selected multiple equipotential curves, resulting in multiple motion paths. Furthermore, the processor 111 selects a motion path from the multiple motion paths according to an optimization criterion. For example, the processor 111 selects two equipotential curves with potential values different from the potential value of the obstacle equipotential curve and determines corresponding two motion paths, for example, a first motion path 305 and a second motion path 307. Both the first motion path 305 and the second motion path 307 connect from a starting point 301 to a target point 303 while avoiding obstacles 309a, 309b, 309c, and 309d. The processor 111 selects one of the first motion path 305 and the second motion path 307, according to the optimization criterion. The optimization criterion may be a smoothness of the motion path, closeness of the motion path to the obstacles 309a, 309b, 309c, and 309d (i.e., safety), length of the motion path, or the like. For example, if the optimization criterion is safety, the processor 111 selects the second motion path 307 as the second motion path 307 is far away from the obstacles 309a, 309b, and 309d compared to the first motion path 305.

Additionally or alternatively, in some embodiments, to enhance smoothness of the first motion path 305 and the second motion path 307, post-processing techniques are applied on the first motion path 305 and the second motion path 307. For example, the processor 111 applies cubic interpolation on the first motion path 305 and the second motion path 307 to produce a first smooth motion path 311 (yellowish curve) and a second smooth motion path 313 (black arrowed curve), respectively.

Further, in some embodiments, to determine the motion path, the processor 111 selects an equipotential curve with a potential value different from the potential value of the obstacle equipotential curve and closest to an average potential value between boundaries 315a and 315b. For example, the processor 111 selects an equipotential curve with potential value closest to −0.5 which is the average potential value between the boundaries 315a and 315b. Such a median equipotential curve can be advantageous because this equipotential curve by construction is distant from the boundaries 315a and 315b and gives the best safety margin to the boundaries 315a and 315b.

Further, the motion of the robot is controlled based on the motion path. In an embodiment, the robot may be a holonomic robot where controllable degrees of freedom are equal to a total degrees of freedom. The controller 109 causes the motion of the holonomic robot to follow the motion path. In another embodiment, the robot may be a non-holonomic robot. The controller 109 generates a kinematically feasible path for the non-holonomic robot based on the motion path and causes the motion of the non-holonomic robot to follow the kinematically feasible path.

In an embodiment, the non-holonomic robot is a vehicle, the bounded space 100 is a parking space, and the target point 105 is associated with a target parking spot. In such an embodiment, the controller 109 generates a kinematically feasible path for the vehicle to park the vehicle at the target parking spot in the parking space. An example scenario of parking the vehicle using the controller 109 is explained below in FIG. 4A, FIG. 4B, and FIG. 4C.

Figure 4A:
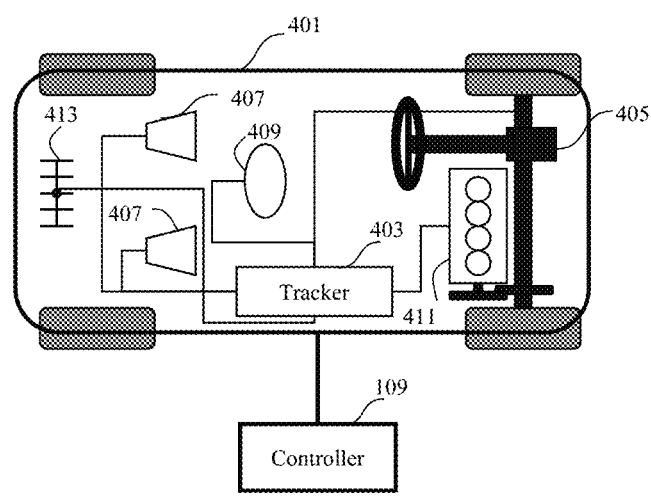
FIG. 4A shows a schematic of a vehicle communicatively coupled to the controller, according to an embodiment of the present disclosure.

FIG. 4A shows a schematic of a vehicle 401 communicatively coupled to the controller 109, according to an embodiment of the present disclosure. The vehicle 401 may be any type of wheeled vehicle, such as a passenger car, bus, or rover. Also, the vehicle 401 can be an autonomous or semi-autonomous vehicle. In one embodiment, a steering system 405 is controlled by a tracker 403. Additionally or alternatively, the steering system 405 may be controlled by a driver of the vehicle 401.

In some embodiments, the vehicle 401 may include an engine 411, which can be controlled by the tracker 403 or by other components of the vehicle 401. In some embodiments, the vehicle 401 may include an electric motor in place of the engine 411 and can be controlled by the tracker 403 or by other components of the vehicle 401. The vehicle 401 can also include one or more sensors 407 to sense the surrounding environment. Examples of the sensors 407 include distance range finders, such as radars. In some embodiments, the vehicle 401 includes one or more sensors 409 to sense its current motion parameters and internal status. Examples of the one or more sensors 409 include global positioning system (GPS), accelerometers, inertial measurement units, gyroscopes, shaft rotational sensors, torque sensors, deflection sensors, pressure sensor, and flow sensors. The sensors provide information to the tracker 403. The vehicle 401 may be equipped with a transceiver 413 enabling communication capabilities of the tracker 403 through wired or wireless communication channels with the controller 109. For example, through the transceiver 413, the tracker 403 receives a kinematically feasible path from the controller 109.

Figure 4B:
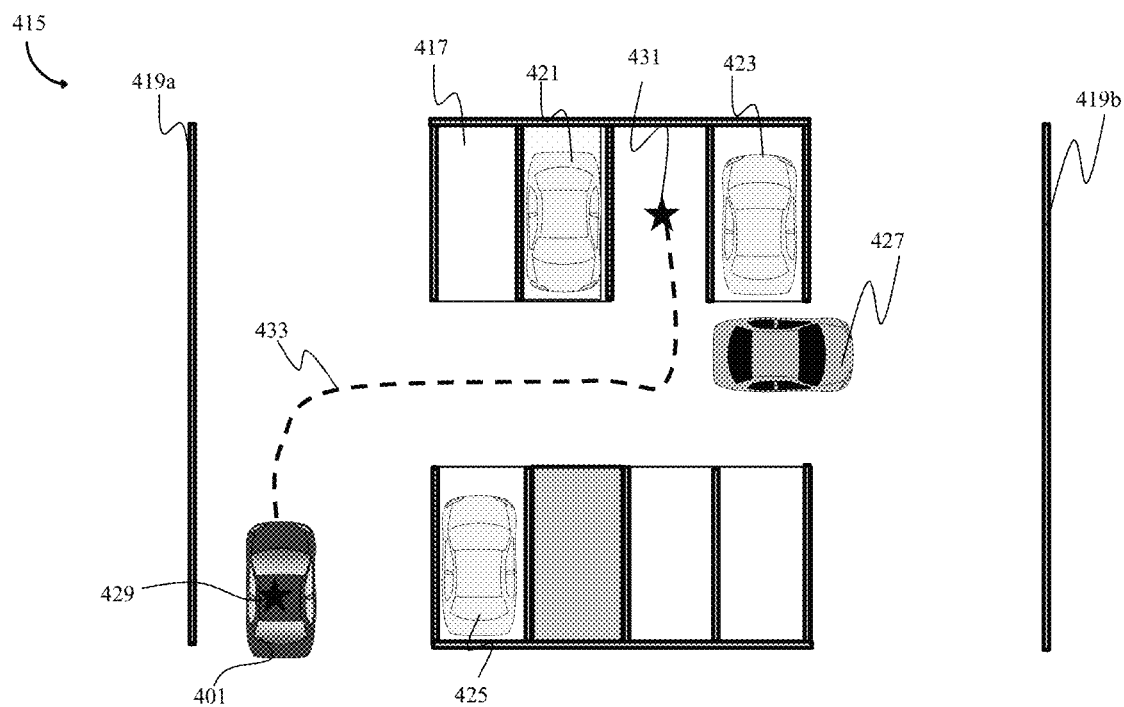
FIG. 4B illustrates parking of the vehicle in a parking space, according to an embodiment of the present disclosure.

FIG. 4B illustrates parking of the vehicle 401 in a parking space 415, according to an embodiment of the present disclosure. The parking space 415 includes parking spots, such as a spot 417, for parking vehicles. The parking space 415 is bounded by boundaries 419a and 419b. The parking space 415 further includes one or multiple obstacles, such as vehicles 421, 423, 425, and 427, with which the vehicle 401 should not collide. The vehicle 401 is at a starting point 429 and needs to be parked at a target parking spot 431, without colliding with the vehicles 421, 423, 425, and 427, and the boundaries 419a and 419b. According to some embodiments, the controller 109 determines a motion path for controlling motion of the vehicle 401 from the starting point 429 to the target parking spot 431. Further, based on the motion path, the controller 109 generates a kinematically feasible path 433. In an embodiment, to generate the kinematically feasible path 433, the controller 109 executes a space sampling method, for example, Rapidly-exploring Random Tree (RRT) algorithm or probabilistic roadmaps (PRM), guided by the motion path generated by the selected equipotential curves. In other words, sampling points are biased toward to the selected equipotential curves. Further, the controller 109 causes motion of the vehicle 401 to follow the kinematically feasible path to park the vehicle 401 at the target parking spot 431.

In particular, in an embodiment, the kinematically feasible path 433 is submitted to the tracker 403 of the vehicle 401. The tracker 403, for example, is a Model Predictive Control (MPC)-based controller configured to track a path of the vehicle 401. The tracker 403 generates control inputs based on the kinematically feasible path 433 to track the kinematically feasible path 433. The control inputs, for example, include control commands specifying values of one or combination of a steering angle of wheels of the vehicle 401, a rotational velocity of vehicle wheels, and an acceleration of the vehicle 401. The control inputs cause the vehicle 401 to navigate along the kinematically feasible path 433 to safely park the vehicle 401 at the target parking spot 431

Additionally, in some embodiments, the bounded space 100 may be indoor space and the controller 109 may control the motion of the robot from a starting point to a target point within the indoor space.

Figure 5:
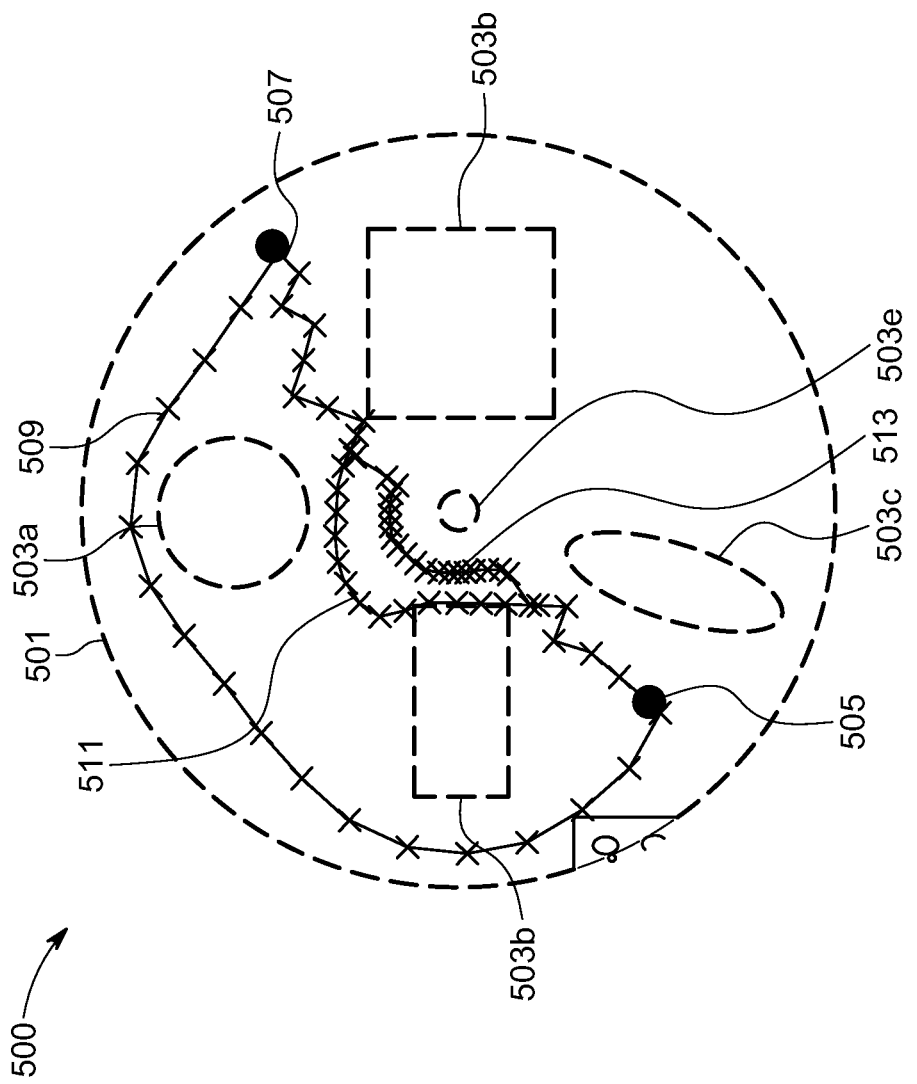
FIG. 5 illustrates an application of the controller for controlling the motion of the robot in an indoor space, according to an embodiment of the present disclosure.

FIG. 5 illustrates an application of the controller 109 for controlling the motion of the robot in an indoor space 500, according to an embodiment of the present disclosure. The indoor space 500 may correspond to indoor space of a room of a building, an indoor space of a warehouse, and the like. The indoor space 500 is bounded by a boundary 501 and includes obstacles 503a, 503b, 503c, 503d, and 503e. According to some embodiments, the controller 109 generates a motion path 509 that connects a starting point 505 and a target point 507 within the indoor space 500. Further, the controller 109 controls the motion of the robot based on the motion path 509, without colliding with the obstacles 503a, 503b, 503c, 503d, and 503e.

Additionally, in some embodiments, the controller 109 determines multiple motion paths 511 and 513 in addition to the motion path 509. The controller 109 further selects the motion path from the multiple motion paths 509, 511, and 513, according to the optimization criterion. Further, the controller 109 controls the motion of the robot based on the selected motion path.

Some embodiments provide a solver to solve for the electric potential in the virtual bounded space to produce the equipotential curves. In an embodiment, the solver is an electrostatic potential solver based on minimization of an energy function with respect to a surface charge density $\lambda(s)$.

Figure 6:
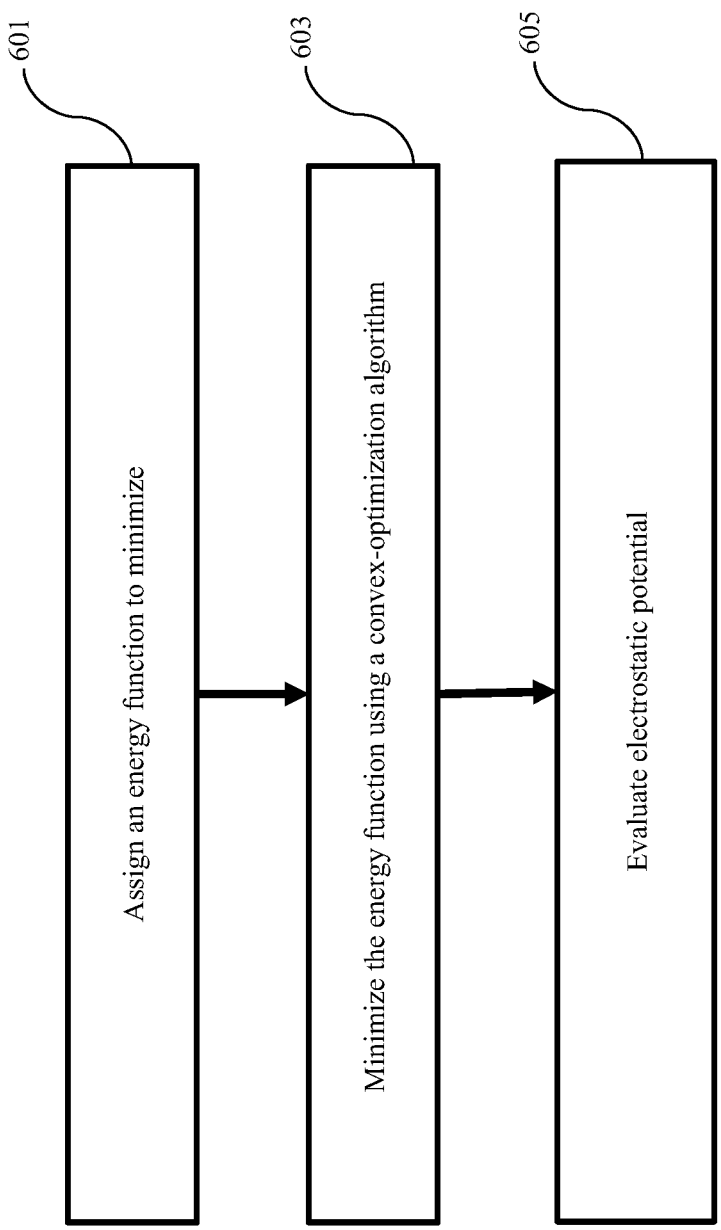
FIG. 6 shows a block diagram illustrating an electrostatic potential solver, according to an embodiment of the present disclosure.

FIG. 6 shows a block diagram illustrating the electrostatic potential solver, according to an embodiment of the present disclosure. For example, the processor 111 is configured to implement the electrostatic potential solver to determine the surface charge density $\lambda(s)$. At block 601, the processor 111 assigns the energy function to minimize. For example, the energy function to minimize is given as $$E_{tot} = \sum_{m=1}^{M} \sum_{i=1}^{N^{(m)}} \lambda_i^{(m)} Q_{m,i} + \frac{1}{2} \sum_{m=1}^{M} \sum_{i=1}^{N^{(m)}} \sum_{m'=1}^{M} \sum_{i'=1}^{N^{(m')}} \lambda_i^{(m)} \lambda_{i'}^{(m')} P_{m,i;m',i'}$$

$$\phi_r(Z|z_1, z_2) = \left[\left(Z - \frac{z_1 + z_2}{2}\right) \cdot \log\left(\frac{z_2 - Z}{z_1 - Z}\right) - \right.$$
$$\left. \frac{z_2 + z_1}{2} \log[(z_2 - Z)(z_1 - Z)] + (z_2 - z_1)\right] \frac{|z_2 - z_1|}{z_2 - z_1}$$

-continued
$$\sum_{i=1}^{N^{(m)}} \lambda_i^{(m)} |dz_i^{(m)}| = Q^{(m)},$$

for $m = 1 - M$.

At block 603, the processor 111 minimizes the energy function using a convex optimization algorithm to determine the surface charge density $\lambda(s)$ and electrostatic potential. Because the energy function is convex, the optimization is stable and is free from trapping to local minima. At block 605, the processor 111 evaluates the electrostatic potential as given below $$\Phi_{ind}^{(n)}(Z|\{z_i^{(n)}\}, \{\lambda_i^{(n)}\}) = \sum_{i=1}^{N^{(n)}} \lambda_i^{(n)} \phi_r(Z|z_i^{(n)}, z_{i+1}^{(n)}).$$

The electrostatic potential solver provided is one of several two-dimensional potential solvers; any solvers, for example, finite-element analysis, can be used. In an embodiment, during online (i.e., real-time) control of the motion of the robot, if a new obstacle is detected, then the processor 111 solves for the electric potential online during the control of the motion of the robot to determine new equipotential curves. Based on the new equipotential curves, the processor 111 determines a new motion path that avoids the new obstacle. Further, the motion of the robot is controlled based on the new motion path.

Figure 7:
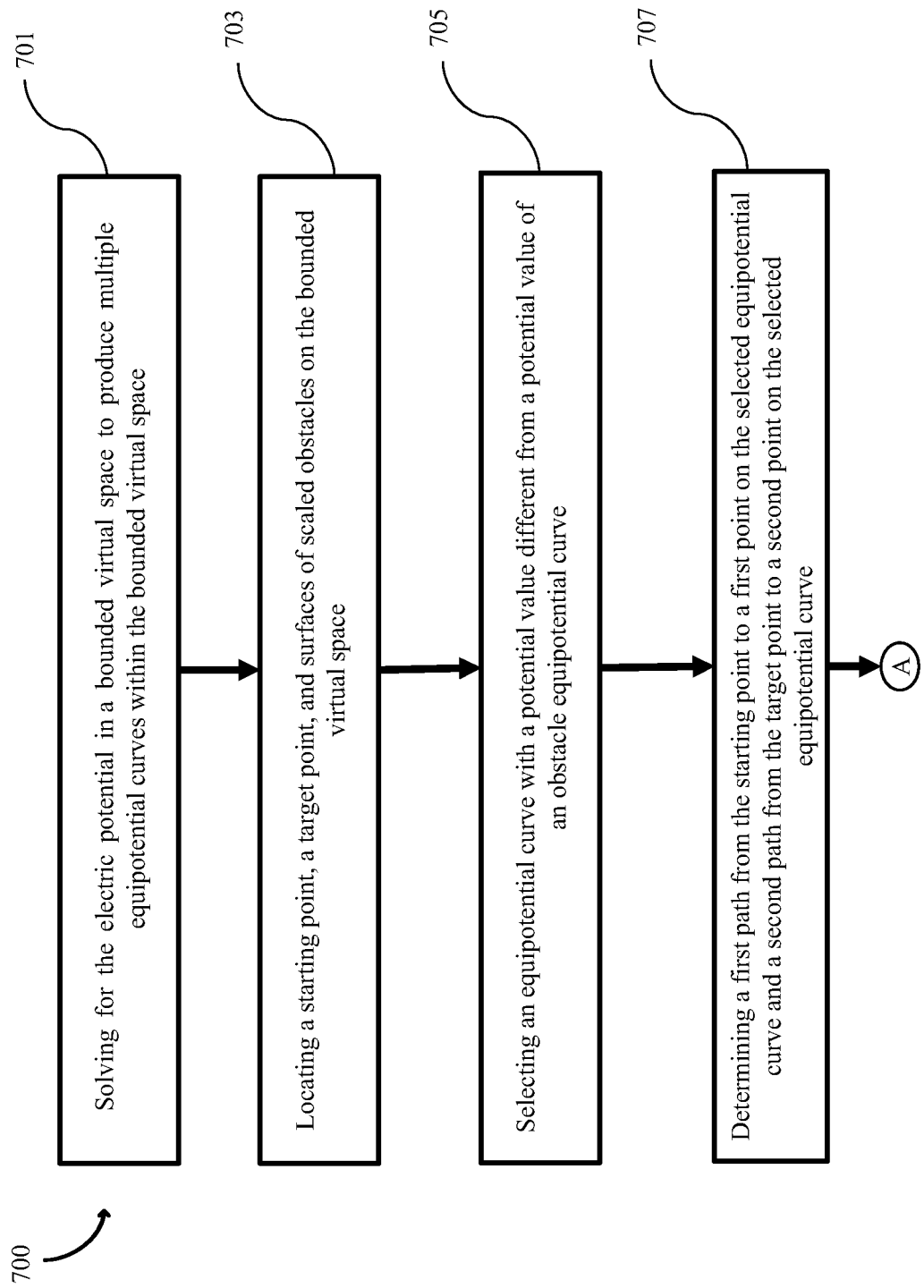
FIG. 7 shows a block diagram of a method for controlling a motion of a robot from a starting point to a target point within a bounded space including one or multiple obstacles, according to an embodiment of the present disclosure.
Figure 7:
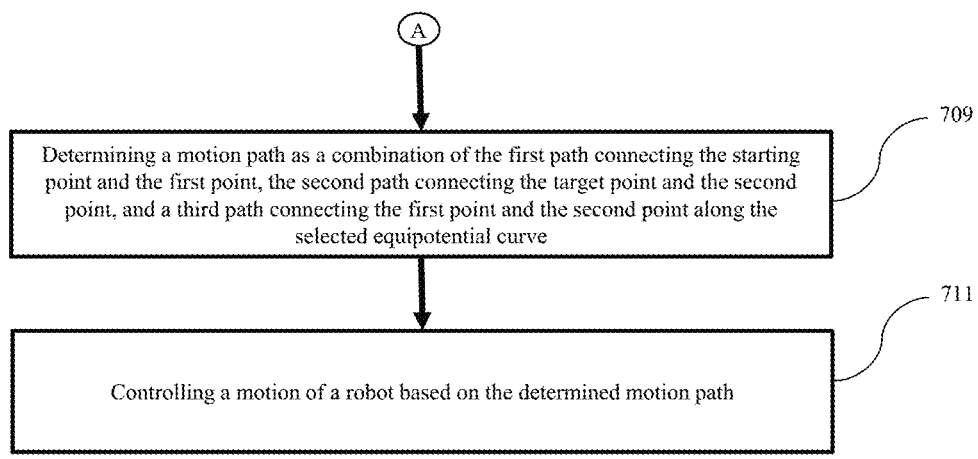

FIG. 7 shows a block diagram of a method 700 for controlling a motion of a robot from a starting point (e.g., the starting point 103) to a target point (e.g., the target point 105) within a bounded space (e.g., the bounded space 100) with a floorplan including one or multiple obstacles, according to an embodiment of the present disclosure. At block 701, the method 700 includes solving for an electric potential in a bounded virtual space to produce multiple equipotential curves within the bounded virtual space. According to an embodiment, the bounded virtual space is formed by scaling the floorplan of the bounded space with the one or multiple obstacles and applying charge to at least two one bound of the bounded virtual space while treating the scaled obstacles as metallic surfaces with a constant potential value.

At block 703, the method 700 includes locating the starting point, the target point, and surfaces of the scaled obstacles on the bounded virtual space to determine a potential value of the starting point, a potential value of the target point, and a potential value of an obstacle equipotential curve closest to the surfaces of the scaled obstacles. At block 705, the method 700 further includes selecting an equipotential curve with a potential value different from the potential value of the obstacle equipotential curve.

At block 707, the method 700 includes determining a first path (e.g., the first path 119) from the starting point to a first point on the selected equipotential curve and a second path (e.g., the second path 123) from the target point to a second point on the selected equipotential curve. The first and the second path are determined such that each segment of the first path and the second path either follows a current equipotential curve or switches between the current equipotential curve and a next equipotential curve in a direction perpendicular to the current equipotential curve towards the potential value of the selected equipotential curve when the next equipotential curve differs from the obstacle equipotential curve.

At block 709, the method 700 includes determining a motion path as a combination of the first path connecting the starting point and the first point, the second path connecting the target point and the second point, and a third path connecting the first point and the second point along the selected equipotential curve. At block 711, the method 700 includes controlling the motion of the robot based on the determined motion path.

Figure 8:
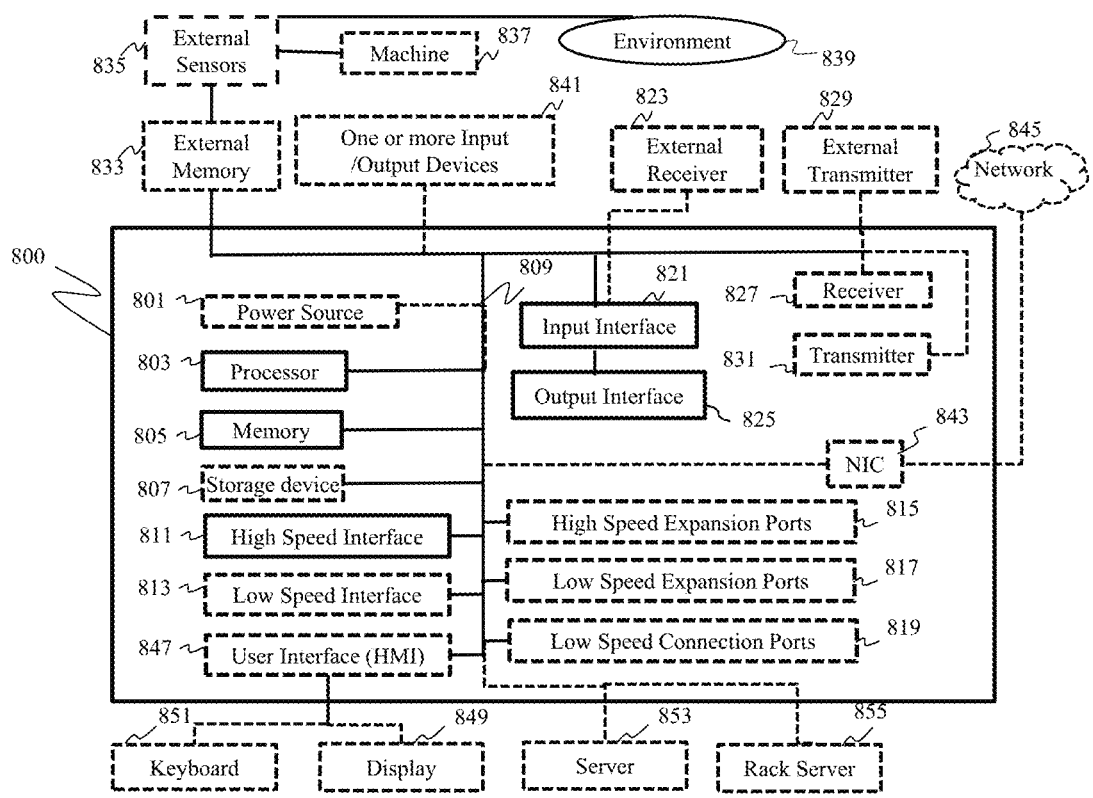
FIG. 8 is a schematic diagram illustrating a computing device that can be used for implementing systems/controllers and methods of the present disclosure.

FIG. 8 is a schematic illustrating a computing device 800 for implementing the methods and systems/controllers of the present disclosure. The computing device 800 includes a power source 801, a processor 803, a memory 805, a storage device 807, all connected to a bus 809. Further, a high-speed interface 811, a low-speed interface 813, high-speed expansion ports 815 and low speed connection ports 817, can be connected to the bus 809. In addition, a low-speed expansion port 819 is in connection with the bus 809. Further, an input interface 821 can be connected via the bus 809 to an external receiver 823 and an output interface 825. A receiver 827 can be connected to an external transmitter 829 and a transmitter 831 via the bus 809. Also connected to the bus 809 can be an external memory 833, external sensors 835, machine(s) 837, and an environment 839. Further, one or more external input/output devices 841 can be connected to the bus 809. A network interface controller (NIC) 843 can be adapted to connect through the bus 809 to a network 845, wherein data or other data, among other things, can be rendered on a third-party display device, third party imaging device, and/or third-party printing device outside of the computing device 800.

The memory 805 can store instructions that are executable by the computing device 800 and any data that can be utilized by the methods and systems of the present disclosure. The memory 805 can include random access memory (RAM), read only memory (ROM), flash memory, or any other suitable memory systems. The memory 805 can be a volatile memory unit or units, and/or a non-volatile memory unit or units. The memory 805 may also be another form of computer-readable medium, such as a magnetic or optical disk.

The storage device 807 can be adapted to store supplementary data and/or software modules used by the computer device 800. The storage device 807 can include a hard drive, an optical drive, a thumb-drive, an array of drives, or any combinations thereof. Further, the storage device 807 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 803), perform one or more methods, such as those described above.

The computing device 800 can be linked through the bus 809, optionally, to a display interface or user Interface (HMI) 847 adapted to connect the computing device 800 to a display device 849 and a keyboard 851, wherein the display device 849 can include a computer monitor, camera, television, projector, or mobile device, among others. In some implementations, the computer device 800 may include a printer interface to connect to a printing device, wherein the printing device can include a liquid inkjet printer, solid ink printer, large-scale commercial printer, thermal printer, UV printer, or dye-sublimation printer, among others.

The high-speed interface 811 manages bandwidth-intensive operations for the computing device 800, while the low-speed interface 813 manages lower bandwidth-intensive operations. Such allocation of functions is an example only. In some implementations, the high-speed interface 811 can be coupled to the memory 805, the user interface (HMI) 848, and to the keyboard 851 and the display 849 (e.g., through a graphics processor or accelerator), and to the high-speed expansion ports 815, which may accept various expansion cards via the bus 809. In an implementation, the low-speed interface 813 is coupled to the storage device 807 and the low-speed expansion ports 817, via the bus 809. The low-speed expansion ports 817, which may include various communication ports (e.g., USB, Bluetooth, Ethernet, wireless Ethernet) may be coupled to the one or more input/output devices 841. The computing device 800 may be connected to a server 853 and a rack server 855. The computing device 800 may be implemented in several different forms. For example, the computing device 800 may be implemented as part of the rack server 855.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicate like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the appended claims to cover all such variations and modifications as come within the true spirit and scope of the present disclosure.

We claim:

1. A controller for controlling a motion of a robot from a starting point to a target point within a bounded space with a floorplan including one or multiple obstacles, the controller comprising: at least one processor; and memory having instructions stored thereon that, when executed by the at least one processor, cause the controller to:

solve for an electric potential in a bounded virtual space formed by scaling the floorplan of the bounded space including the one or multiple obstacles, and applying charge to at least one bound of the bounded virtual space while treating the scaled obstacles as metallic surfaces with a constant potential value, wherein the electric potential provides multiple equipotential curves within the bounded virtual space;

locate the starting point, the target point, and surfaces of the scaled obstacles in the bounded virtual space to determine a potential value of the starting point, a potential value of the target point, and a potential value of an obstacle equipotential curve closest to the surfaces of the scaled obstacles;

select an equipotential curve with a potential value different from the potential value of the obstacle equipotential curve;

determine a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve;

determine a motion path as a combination of the first path connecting the starting point and the first point, the second path connecting the target point and the second point, and a third path connecting the first point and the second point along the selected equipotential curve; and control the motion of the robot based on the determined motion path.

2. The controller of claim 1, wherein the processor is further configured to extend the first path in a direction perpendicular to the current equipotential curve towards the potential value of the selected equipotential curve until the first path reaches the selected equipotential curve or the next equipotential curve is the obstacle equipotential curve.

3. The controller of claim 2, wherein the processor is further configured to extend the second path in the direction perpendicular to the current equipotential curve towards the potential value of the selected equipotential curve until the second path reaches the selected equipotential curve or the next equipotential curve is the obstacle equipotential curve.

4. The controller of claim 2, wherein, when the next equipotential curve is the obstacle equipotential curve, the processor is further configured to extend the first or the second path to follow the current equipotential curve with a predetermined step until the next equipotential curve stops being the obstacle equipotential curve.

5. A method for controlling a motion of a robot from a starting point to a target point within a bounded space with a floorplan including one or multiple obstacles, the method comprising:

solving for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space;

locating the starting point, the target point, and surfaces of the scaled obstacles in the bounded virtual space to determine a potential value of the starting point, a potential value of the target point, and a potential value of an obstacle equipotential curve closest to the surfaces of the scaled obstacles;

selecting an equipotential curve with a potential value different from the potential value of the obstacle equipotential curve;

determining a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve;

determining a motion path as a combination of the first path connecting the starting point and the first point, the second path connecting the target point and the second point, and a third path connecting the first point and the second point along the selected equipotential curve; and controlling the motion of the robot based on the determined motion path.

6. The method of claim 5, wherein the method further comprises extending the first path and the second path in a direction perpendicular to the current equipotential curve towards the potential value of the selected equipotential curve until the first path and the second path reach the selected equipotential curve or the next equipotential curve is the obstacle equipotential curve.

7. The method of claim 6, wherein, when the next equipotential curve is the obstacle equipotential curve, the method further comprises extending the first or the second path to follow the current equipotential curve with a predetermined step until the next equipotential curve stops being the obstacle equipotential curve.

8. A non-transitory computer-readable storage medium embodied thereon a program executable by a processor for performing a method for controlling a motion of a robot from a starting point to a target point within a bounded space with a floorplan including one or multiple obstacles, the method comprising:

solving for an electric potential in a bounded virtual space formed by scaling the floorplan of the bounded space with the one or multiple obstacles and applying charge to at least one bound of the bounded virtual space while treating the scaled obstacles as metallic surfaces with a constant potential value, wherein the electric potential provides multiple equipotential curves within the bounded virtual space;

locating the starting point, the target point, and surfaces of the scaled obstacles onin the bounded virtual space to determine a potential value of the starting point, a potential value of the target point, and a potential value of an obstacle equipotential curve closest to the surfaces of the scaled obstacles;

selecting an equipotential curve with a potential value different from the potential value of the obstacle equipotential curve;

determining a first path from the starting point to a first point on the selected equipotential curve and a second path from the target point to a second point on the selected equipotential curve, such that each segment of the first path and the second path either follows a current equipotential curve or moves between the current equipotential curve and a next equipotential curve in a direction perpendicular to the current equipotential curve towards the potential value of the selected equipotential curve when the next equipotential curve differs from the obstacle equipotential curve;

determining a motion path as a combination of the first path connecting the starting point and the first point, the second path connecting the target point and the second point, and a third path connecting the first point and the second point along the selected equipotential curve; and controlling the motion of the robot based on the determined motion path.

9. The non-transitory computer-readable storage medium of claim 8, wherein the method further comprises extending the first path and the second path in a direction perpendicular to the current equipotential curve towards the potential value of the selected equipotential curve until the first path and the second path reach the selected equipotential curve or the next equipotential curve is the obstacle equipotential curve.

10. The non-transitory computer-readable storage medium of claim 8, wherein, when the next equipotential curve is the obstacle equipotential curve, the method further comprises extending the first or the second path to follow the current equipotential curve with a predetermined step until the next equipotential curve stops being the obstacle equipotential curve.

* * * * *